United States Patent
Statham et al.

(10) Patent No.: US 8,219,816 B2
(45) Date of Patent: Jul. 10, 2012

(54) IVR CALL ROUTING USING ENCRYPTED DATA

(75) Inventors: Steven W. Statham, Monument, CO (US); Kirk R. Hill, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 809 days.

(21) Appl. No.: 12/342,584

(22) Filed: Dec. 23, 2008

(65) Prior Publication Data

US 2010/0161990 A1   Jun. 24, 2010

(51) Int. Cl.
*H04L 9/32* (2006.01)

(52) U.S. Cl. ............................................. 713/172

(58) Field of Classification Search .................. 713/172; 380/257
See application file for complete search history.

(56) References Cited

U.S. PATENT DOCUMENTS

| | | | |
|---|---|---|---|
| 7,031,450 B2 * | 4/2006 | Evslin | 379/220.01 |
| 7,539,176 B1 * | 5/2009 | Chellappa et al. | 370/351 |
| 7,881,471 B2 * | 2/2011 | Spohrer et al. | 380/257 |
| 7,986,773 B2 * | 7/2011 | Kalahasti et al. | 379/88.23 |
| 2005/0083974 A1 * | 4/2005 | Mayer et al. | 370/474 |

* cited by examiner

*Primary Examiner* — Philip Chea

(57) ABSTRACT

A token representing encrypted data is used to initiate a call routing strategy based on receipt of the token. The call routing strategy is configured to initiate a query. Decrypted data associated with the encrypted data may be accessed to determine a data relationship based on the query.

16 Claims, 4 Drawing Sheets

IVR CALL ROUTING USING ENCRYPTED DATA

BACKGROUND

In recent years, protecting one's personal information from identity theft and other forms of misappropriation has been a growing concern for many consumers. With increased frequency, consumers are being asked to provide personal identifying information over the phone or the Internet. For example, many companies offer automated phone services wherein a customer can call into a designated customer service phone line to receive account information and services such as current balance information, past balances, payments received, payments due and bill payment options, to name a few. To access these services, the customer is required to enter, either verbally or through a key pad, potentially sensitive personal information such as a social security number, an account number, an address or a driver's license number. For many of these automated systems, the customer is requested to enter this personal information at the beginning of the call, which is then used by the system to determine where the call should, at least initially, be routed. In some situations, the call may need to be routed to a database in a server to retrieve automated account information, while in other situations, the call may need to be routed to an appropriate customer service representative. Nevertheless, the routing paths are generally not direct, meaning that the call, including the potentially sensitive personal information, will ultimately be passed through several routers, gateways or servers before reaching its destination. Each time the call is passed from one system component to another along its routing path, the security of the information is at risk for being unintentionally disclosed.

A known method for protecting information as it passes through the system is to encrypt it, which successfully prevents direct access to the actual information if it is acquired by an unauthorized individual. In some cases, however, an employee may have access to a company's infrastructure and resources, allowing them to decrypt the information or to have access to the unencrypted or decrypted version of the information.

For example, in one known automated system, call routing decisions are determined by an application referred to as a strategy or script. The strategies are written by company employees (i.e., "strategy writers"), and are in essence configured to route a call based in part on the information provided by the customer. For example, if a customer calls into a bank calling center to obtain account balance information, but ultimately decides that they would like to speak to a customer service representative, the customer is likely to be asked to enter an account number. The account number, or portions thereof, is used by the strategy to direct the call to an appropriate agent. For example, one customer service agent may be charged with handling all calls relating to savings accounts, while another may be responsible for handling all calls relating to business checking. The account type is generally indicated by designated digits in the account number. Thus, the strategy is configured to "look" at the appropriate designated digits to determine the department or agent the call should be routed to. In this scenario, however, the strategy writer may have unfettered access to a customer's personal information by writing the routing strategies in a way that allows him or her to have access to the sensitive information that could later be used in an unauthorized manner.

Therefore, a call routing system is needed that prevents unauthorized persons from accessing information as the call is routed through the system.

DETAILED DESCRIPTION

Figure 1:
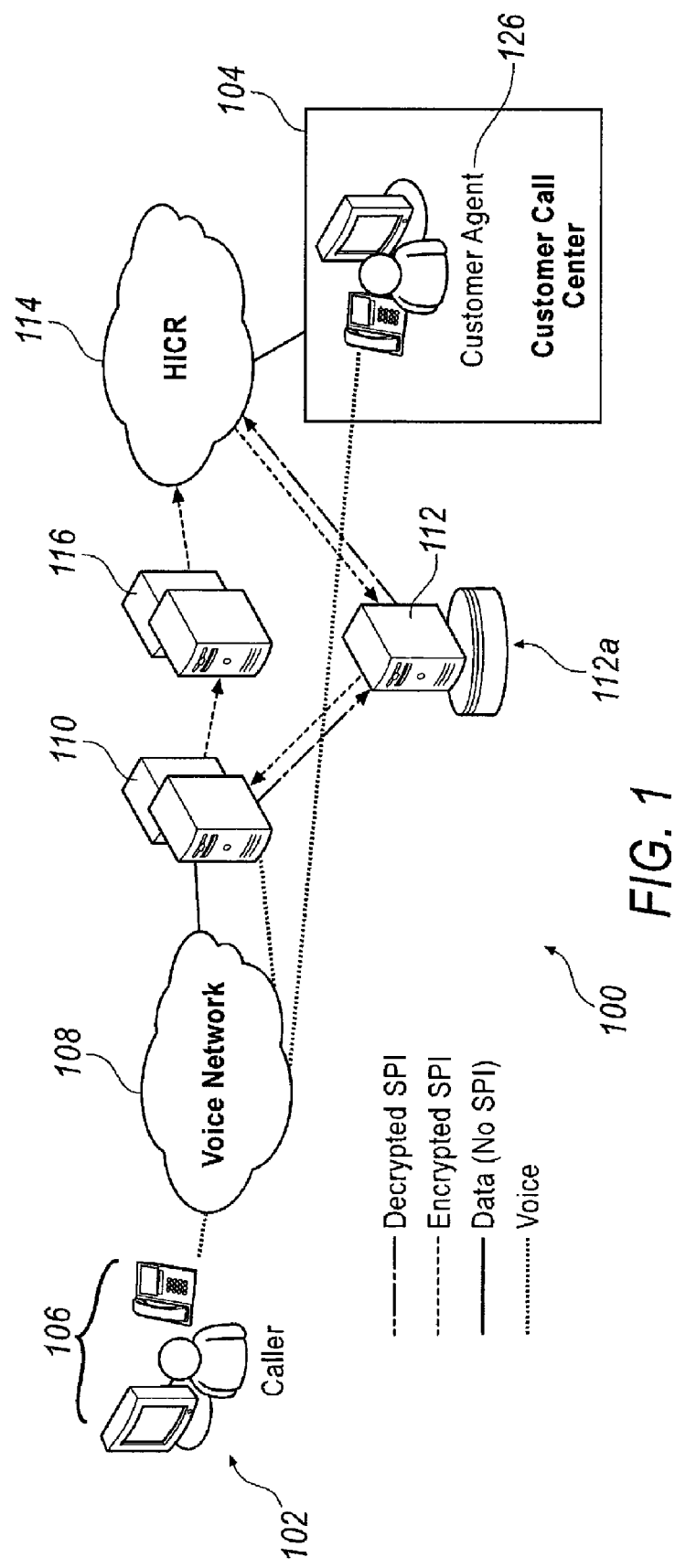
FIG. 1 illustrates an exemplary call routing system for securing and isolating sensitive personal information.

A system and method for securing and isolating sensitive personal information in a call routing system is provided. In one exemplary approach, the call routing system is used in connection with a customer call center that provides a caller with automated phone services and access to customer service representatives. To reach these services or a representative, a caller is generally requested to enter sensitive personal information (SPI), such as, an account number, a social security number, an address, a birth date, a driver's license number, or an answer to a challenge question, to name a few. Once the SPI data has been entered by the caller, an interactive voice response (IVR) server transmits the SPI data to an encryption module for encryption and entry into a secure database. The encryption module thereafter returns to the IVR a token representing the encrypted SPI data. The token, as part of a call processing message, is transmitted to a hosted intelligent contact routing (HICR) system associated with the customer call center. The HICR includes a routing engine configured to access one of a plurality of strategies for routing the call to an appropriate customer service representative based on information contained in the SPI data. For example, if the SPI is an account number, the first four digits of the account number may represent the account type, which in some cases, may direct the call routing decision.

In one known call processing approach, strategies are configured to directly access the relevant portion(s) of the SPI data to determine call routing decisions. In other words, the strategy is able to access the actual SPI data, which as discussed above, increases the risk that the SPI will be misappropriated. In general, strategies are written using a graphical interface language that can also be used to write data to a file or database. Having the ability to extract and write the data to a remote file or database provides an opportunity for the SPI to be used potentially inappropriately. Thus, the SPI data in its decrypted form is ideally isolated and protected from exposure to HICR components and routing strategies.

In one exemplary approach, the routing engine in the HICR receives the call processing message, which may include a token identification (ID) representing the encrypted SPI data. Upon detecting a token ID in the message, the routing engine calls (i.e., initiates) a given strategy, which in one approach, is selected based upon the specific toll free (e.g., 8XX) number that was called. The strategies are configured to initiate one of several functions (i.e., methods) designed to query the SPI data in the encryption module and return to the strategy a yes/no or true/false response. The queries are generally comparative operators, such as greater than, less than, equal to, etc. The functions define the type and range of the SPI query and are executed through a custom server application that contains an embedded custom code, which provides an interface between the HICR and the actual SPI data in the encryption module. Based on the response to the query, the strategy determines the appropriate path in which to route the call.

Thus, instead of the strategy directly accessing the decrypted SPI to determine call routing information, the strategy is limited to a set of predetermined methods that are designed to allow for only true/false responses based on a portion of the SPI data.

FIG. 1 illustrates an exemplary call routing system 100 in which a caller 102 initiates a call request to a customer service call center 104 having a particular department or customer agent 126 using any suitable communications device 106, such as, but not limited to, a cell phone, a land-line phone, a computer or a personal digital assistant (PDA). The call can be initiated using any assigned number, but is generally a toll-free 8XX number linked to a particular customer call center 104 through a network 108 having voice capabilities, which in at least one non-limiting example, is a public switched telephone network (PSTN). The caller 102 may be contacting the customer service call center 104 for any number of reasons including, but not limited to, accessing account information, order tracking, billing questions, etc. In most instances, the caller is required to provide identifying information such as an account number or order number. Other identifying personal information such as a social security number, a driver's license number or a birth date may also be used to verify a caller's identity. This identifying and personal information is collectively referred to hereinafter as sensitive personal information (SPI) data.

From network 108, the caller 102 is routed to an interactive voice response (IVR) server 110 that initiates a series of voice prompts offering various service options to the caller 102. In one approach, one of the voice prompts requests the caller 102 to enter SPI data, which is then transmitted to an encryption module 112 for encryption and storage in a database 112a within the encryption module 112. The encryption module 112 employs a plurality of methods for encrypting the SPI data. For example, one method is referred to as the Generic (GEN) data method that provides an encryption method for any alphanumeric character (i.e., visible characters) from length 8-65536 (64K). If an SPI data value is less than 8 characters, a standard pad can be added prior to encryption. Other encryption types (methods) include legacy (LEG), social security number (SSN), credit card number (CCN), bank account number (BAN), drivers license number (DLN), customer account number (CAN), and payroll account number (PAN). The encryption methods for each encryption are maintained in the encryption database 112a in an interface control document (ICD).

The encrypted version of the SPI data is returned to IVR 110 in the form of a token, which in one approach, has a randomly assigned number representing the encrypted SPI data. The assigned number is used to identify the token throughout the call process and is referred to as the token ID. From IVR 110, a call processing message containing the call request and the token ID are sent to a hosted intelligent contact routing (HICR) 114 system through a router gateway 116, which is configured to translate messages between IVR 110 and HICR 114. More specifically, the router gateway 116 translates the message into a format understood by components of the HICR 114, namely routing engine 206 (shown in FIG. 2). In this way, the actual SPI data is secured in the encryption module database 112a and only the token ID is transmitted through the system. Other devices connecting to the IVR 110 to the HICR 114 and the customer service call center 104, e.g. switches, intervening routers, servers, etc., are omitted for simplicity of illustration in FIG. 1. Moreover, while separate components are illustrated for convenience, one or more of the components may be combined into a single component while still maintaining the indicated operability.

Figure 2:
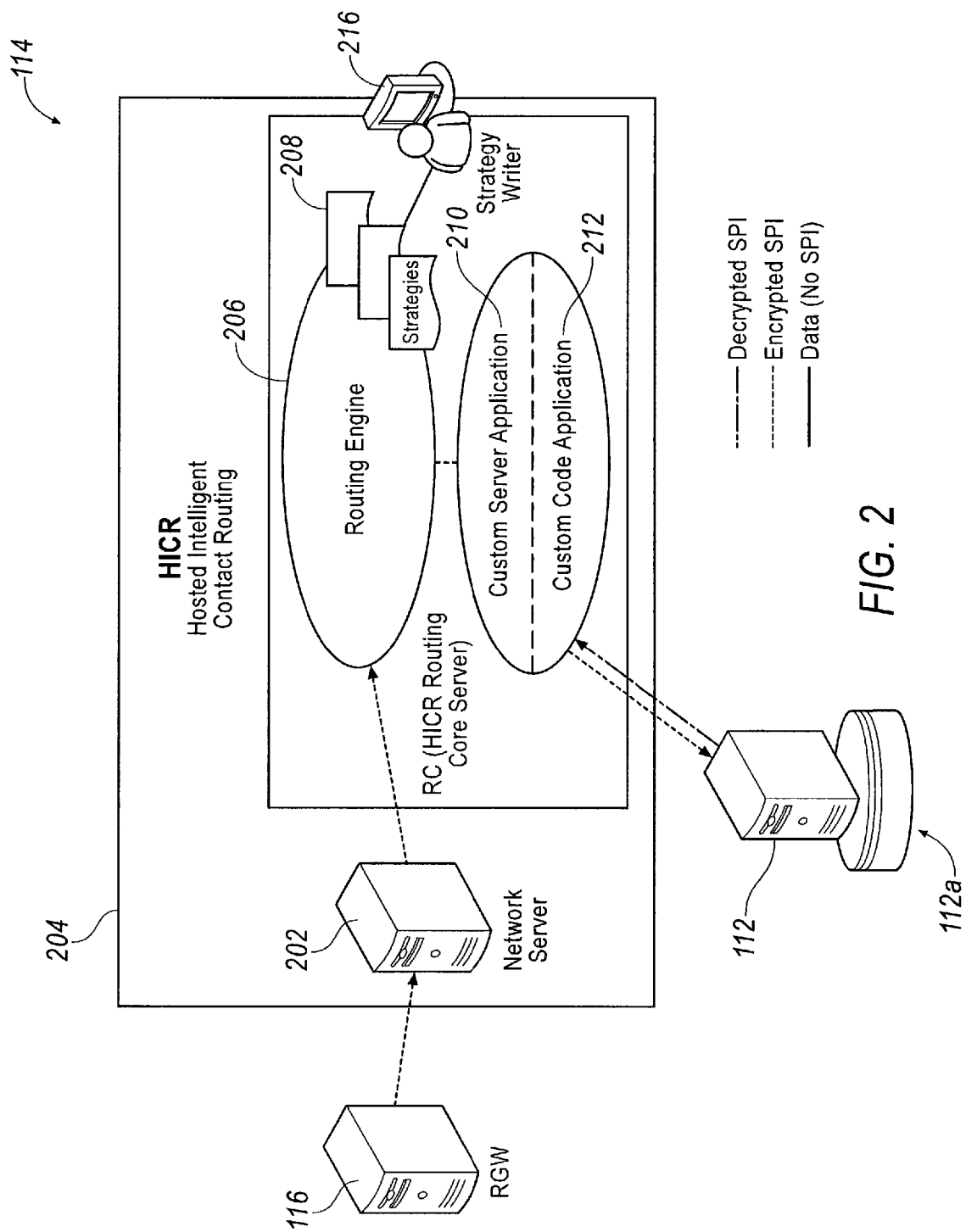
FIG. 2 illustrates an exemplary hosted intelligent contact routing system according to the call routing system of FIG. 1.

FIG. 2 illustrates an exemplary HICR system 114 according to the call routing system 100 shown in FIG. 1. Other devices may reside within, and are in communication with, HICR 114, e.g. switches, intervening routers, servers, etc., but are omitted for simplicity of illustration in FIG. 2. The HICR 114 includes a network server 202 that translates messages from the router gateway 116 into a format that is more generally recognizable by the components of the HICR 114, namely a routing core server 204. The routing core server 204 includes a routing engine 206 configured to implement strategies 208 for routing the caller 102 to an appropriate department or agent 126 at customer service call center 104.

The routing engine 206 determines where to route a call based on the incoming messages from the IVR 110 and the implementation of the strategies 208. Upon receipt of a message, the routing engine 206 looks to see if the incoming message contains a token ID, which indicates that the SPI data in the message is encrypted. The encryption requires the routing engine 206 to call (i.e., initiate) a strategy, which determines where to route the call based on responses to queries about the actual SPI data hidden behind the token. The routing engine 206 may select a particular strategy based on the 8XX number dialed by the caller 102 or some other criteria. For each client (i.e., the voice network customer associated with a particular customer call center), there may be many (e.g., hundreds) of strategies 208 based on the criteria selected such as assigned 8XX numbers.

When a strategy is initiated by the routing engine, a custom server application 210 residing on the routing core server 204 is also initiated. The custom server application 210 is configured to provide an interface to write custom heuristics for call processing within the HICR 114. The custom server application 210 contains specific rules that allow the routing engine 206 to interface with a custom code application 212 that is part of, and in some cases, embedded within the customer server application 210. The custom code application 212 is designed to interface with the encryption module 112, generally through a persistent SSL TCP/IP connection. The custom server application 210 links with the custom code application 212 through a shared object library. In this way, instead of just passing decrypted SPI data to the routing engine 206, the strategies 208 are limited to only true or false responses from the custom code application 212. In this configuration, only the custom code application 212 sees the decrypted SPI data within the HICR 114 platform.

Figure 3:
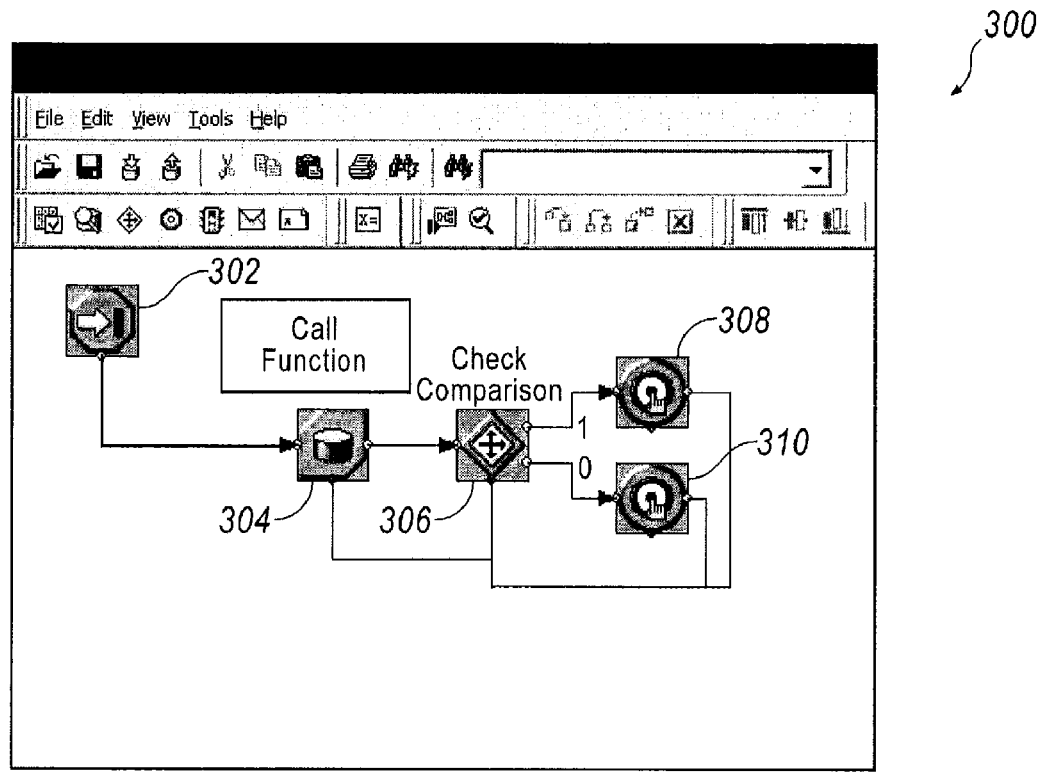
FIG. 3 illustrates an exemplary strategy

FIG. 3 illustrates an exemplary strategy 300, which is created by a strategy writer 216 as shown in FIG. 2. In general, a strategy determines how to route an incoming call based on the SPI data entered by caller 102. For example, if the caller 102 is a gold card member, there are generally one or more digits within the caller's account number that identifies the caller 102 as a gold card member. In some cases, a client may want a caller routed to a particular department or agent based in part on what type (e.g., gold, silver or platinum) of membership they have. However, since the strategy alone does not have access to the actual SPI data, the strategy is configured to call one of a plurality of pre-defined functions (otherwise referred to as methods) from the custom server application 210, and ultimately, from the custom code application 212. The functions are configured to query the SPI data to make a routing decision without being exposed to the actual SPI.

In essence, the function is configured to query a particular data relationship in the SPI data, and return to the strategy a yes/no or true/false response (i.e., 1 or 0, respectively) without having access to the data itself. For example, the function may be configured to ask if the fifth character of the account number is a three. If the fifth character is a three, a yes or true response is returned to the strategy. If the fifth character is not a three, a no or false response is returned to the strategy. The strategy may be configured to ask another question, or to route the call according to the response regarding the fifth character.

Referring again to FIG. 3, strategy 300 includes an entry block 302, wherein the strategy grabs the token ID from the message and assigns the token ID to a call variable field used by this particular strategy. At this point, the strategy initiates the pre-defined function at function call block 304 for this particular strategy. In general, there are a plurality of functions that can be assigned to various strategies depending on the client requirements. The functions are created by the strategy writer 216 in advance and selected based in part on the type of customer account being accessed and the format of the SPI data being queried.

Figure 4:
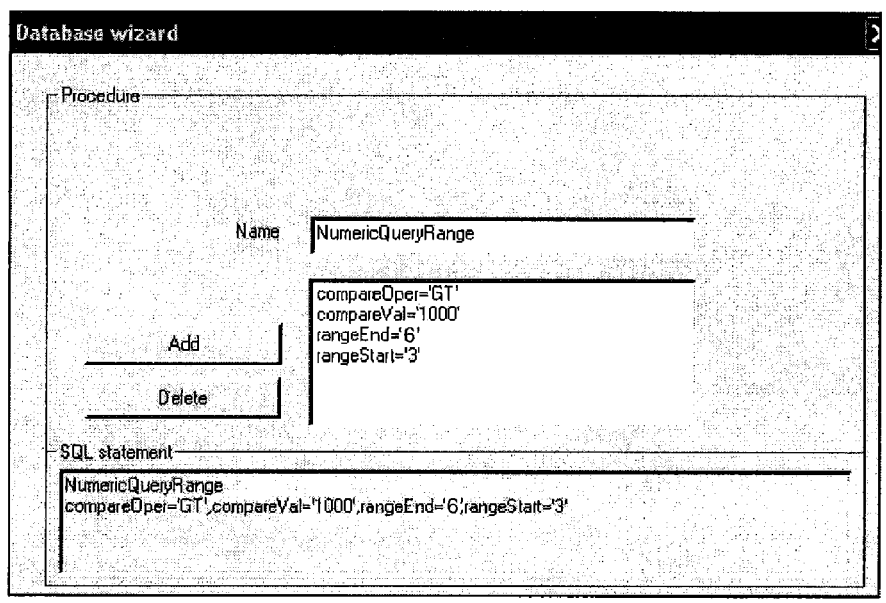
FIG. 4 illustrates a development screen for an exemplary function.

FIG. 4 illustrates a development screen for an exemplary function in accordance with strategy shown in FIG. 3. In this example, the function is a numeric query range function, which examines numeric SPI data, but may also be without limitation, an alpha query range configured to examine alphanumeric SPI data. The numeric query range function is configured to determine if the numeric data corresponding to the given token ID exists within a specified range defined by the "rangeStart" and "rangeEnd" fields. In the example shown in FIG. 4, the range for this particular function starts with the third character of the data string and ends with the sixth character. In addition to a range, the function also defines a comparative operand (e.g., compareOper) and provides a compare value (e.g., compareVal). In this case, the compare operand is a greater than function (GT) and the compare value is 1000. It should be understood, however, that any comparative operand can be used, such as, less than, less than or equal to, equal to, greater than or equal to, or not equal to. Thus, in the example shown, the numeric query range function is looking to see if characters 3-6 of the SPI data are greater than 1000.

Referring again to the strategy shown in FIG. 3, at block 306 the result generated by the function is checked to determine the call path based on the response. If the numeric query range function determines that characters 3-6 in the SPI data are greater than 1000, then the function returns a "1" to block 306 in strategy 300. If characters 3-6 are not greater than 1000, a "0" is returned to block 306. If the response is a "1", the path is routed to block 308 where the call is routed to an agent 116 in call center 104. If the response is a "0", the path is routed to block 310, which in one example, is a default route back to IVR 110 for further call processing. It should be understood that the strategy shown in FIG. 3 is merely one example of a strategy. Any number of strategy configurations are possible depending on the given call system and client needs.

Figure 5:
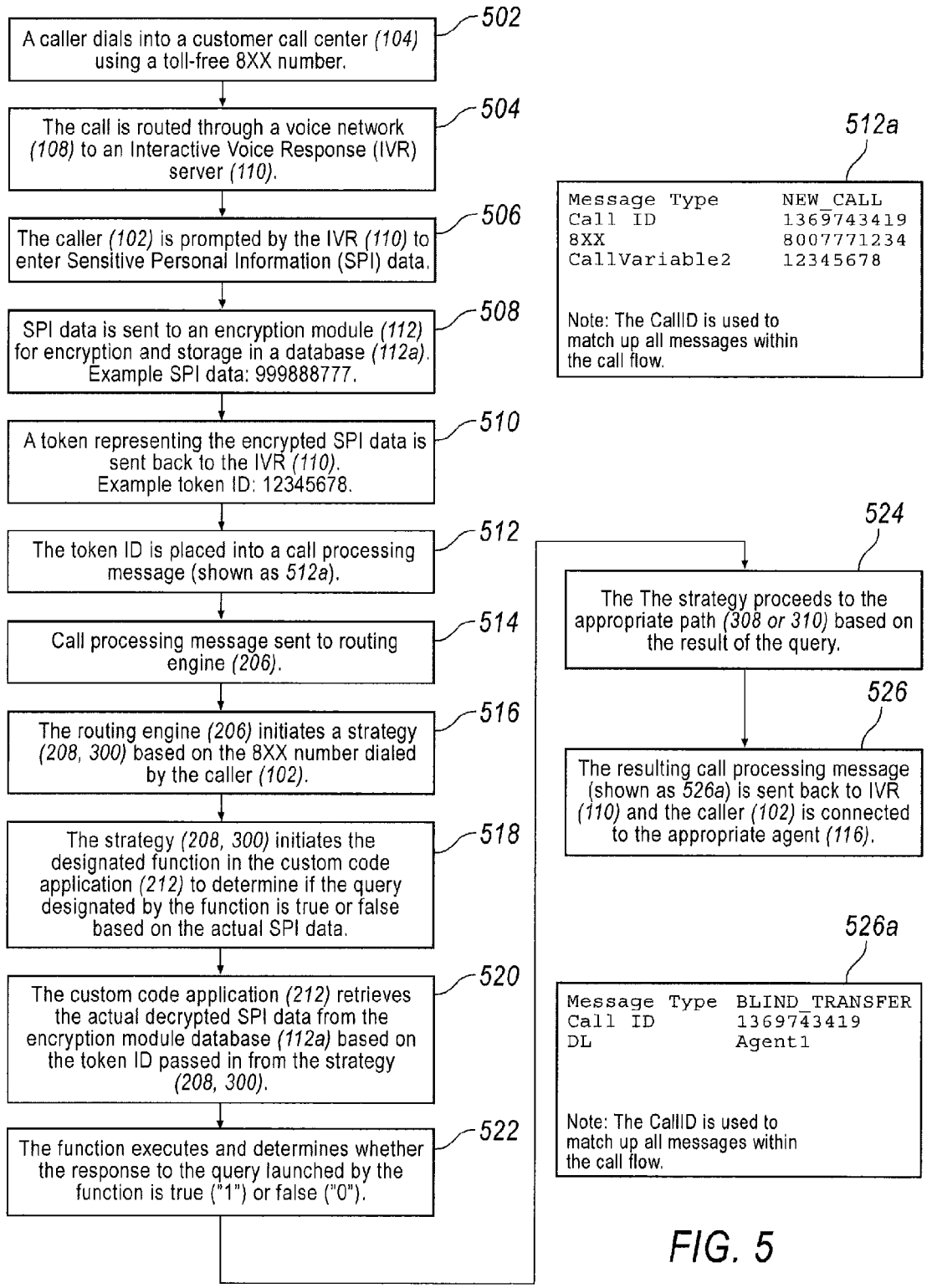
FIG. 5 illustrates an illustrative process for implementing an exemplary call routing system.

FIG. 5 illustrates an exemplary call routing process according to the call routing system 100 set forth above. At step 502, a caller 102 dials into a customer call center 104 using a number such as a toll-free 8XX number. At step 504, the call is routed through a voice network 108 to an interactive voice response (IVR) server 110. At step 506, the caller 102 is prompted by the IVR 110 to enter sensitive personal information (SPI) data, which is sent at step 508 to an encryption module 112 for encryption and storage in a database 112a. In this example, the SPI data entered by the caller 102 is 999888777. At step 510 a token representing the encrypted SPI data is sent back to the IVR 110. The token ID in this example is 12345678. At step 512, the token ID is placed into a call processing message (shown as 512a), and at step 514, the message is sent to routing engine 206 through routing gateway 116 and network server 202. At step 516, the routing engine 206 initiates a strategy 208, 300 based, at least in part, on the number dialed by the caller 102. At step 518 the strategy 208, 300 initiates the designated function in the custom code application 212 to determine if the query designated by the function is true or false based on the actual SPI data. At step 520, the custom code application 212 retrieves the actual decrypted SPI data from the encryption module database 112a based on the token ID passed in from the strategy 208, 300. At step 522, the function executes and determines whether the response to the query launched by the function is true ("1") or false ("0"). If in this case, like the function shown in FIG. 4, the function is configured to look at characters 3-6 of the actual SPI data and compare those characters to 1000, the comparison would be "is 9888 greater than 1000"? At step 524 the strategy proceeds to the appropriate path (i.e., either blocks 308 or 310 in FIG. 3) based on the result of the query, which in this example is a "1". At step 526, the resulting call processing message (shown as 526a), which includes the routing path, is sent back to IVR 110 and the caller 102 is connected to the appropriate agent 116.

The components of the call routing system 100 may each include computing devices that generally include applications, which may be software applications tangibly embodied as a set of computer-executable instructions on a computer readable medium within the computing devices. The computing devices, including, for example, components 106, 110, 112, 116, and various elements of HICR 114 may be any one of a number of electronic computing devices, such as a laptop or desktop computer, handheld computing device, cellular telephone, embedded microprocessor, etc. Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system (e.g., Linux Red Hat running on Intel based processors).

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

The call routing system 100 may include a variety of hardware and/or software, and may be associated with a relational database management system from which data may be extracted. However, the call routing system 100 may also represent other mechanisms for providing data, such as data stored in one or more files and obtained via file transfer protocol (FTP) or the like, data obtained from a computer-readable medium such as a disk or tape, or even manual entry of data, among other possible mechanisms. The precise number and type of computer servers included in the call routing system 100 is not crucial. Further, it is not crucial that any of the information be stored in any particular data store. Thus, the call routing system 100 may be configured to a variety of architectures.

A call routing system 100 generally employs Structured Query Language (SQL) in addition to a language for creating, storing, editing, and executing stored procedures, such as the PL/SQL language mentioned above. However, it is to be understood that data stores associated with a computing device may be some other kind of database such as a hierarchical database, a set of files, and an application database in a proprietary format, etc. A data store often includes a computing device employing a computer operating system such as one of those mentioned above, and are accessed via a network in any one or more of a variety of manners, as is well known.

The method steps 502-526 described herein may be generally tangibly embodied as one or more sets of computer-executable instructions stored on a computer-readable medium. Such computer readable-medium may be included in or associated with one or more computing devices, even if such devices are not illustrated in the figures. The method steps accordingly generally execute within one or more such computing devices. The computer-readable medium includes any medium, including a tangible medium, which participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The tangible computer-readable medium may include instructions for performing any of the steps previously recited. However, it is to be appreciated that the tangible computer-readable medium may include instructions for performing steps other than those recited. It is to be further appreciated that some of steps may be performed by the computer, whereas other steps may be performed by a person or another computer.

Transmission media may include coaxial cables, copper wire, and fiber optics, including the wires that comprise a system bus coupled to a processor. Transmission media may include or convey acoustic waves, light waves and electromagnetic emissions, such as those generated during radio frequency (RF) and infrared (IR) data communications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
receiving a call processing message including a token representing encrypted data, the encrypted data including sensitive personal information associated with a call;
initiating a call routing strategy based on receipt of the call processing message, the call routing strategy being configured to initiate a query specifying a comparison to be performed against a decrypted version of the encrypted data associated with the token, the query providing an interface between the call routing strategy and the decrypted data to prevent the call routing strategy from accessing the decrypted data; and
determining a call routing decision for the call based on a result of the comparison returned from the query.

2. The method of claim 1, wherein the comparison specified by the query includes comparing predetermined characters of the decrypted data to a value.

3. The method of claim 2, wherein comparing the predetermined character of the decrypted data to a value is based on at least one of a plurality of operands.

4. The method of claim 1, further comprising receiving the result of the query by the call routing strategy.

5. The method of claim 4, wherein the result of the query is a Boolean result.

6. The method of claim 1, further comprising receiving the sensitive personal information from a caller of the call.

7. A system, comprising:
a computing device including a processor configured to execute instructions to cause the computing device to
receive a token representing encrypted data, the encrypted data including sensitive personal information associated with a call;
initiate a call routing strategy based on receipt of the token, the call routing strategy being configured to initiate a query specifying a comparison to be performed against a decrypted version of the encrypted data associated with the token, the query being configured to provide an interface between the call routing strategy and the decrypted data to prevent the call routing strategy from accessing the decrypted data; and
determine a call routing decision for the call based on a result of the comparison returned from the query.

8. The system of claim 7, wherein the comparison specified by the query includes comparing predetermined characters of the decrypted data to a value.

9. The system of claim 8, wherein comparing the predetermined character of the decrypted data to a value is based on one of a plurality of operands.

10. The system of claim 7, further including transmitting to the call routing strategy the result of the query.

11. The system of claim 10, wherein the result of the query is a Boolean result.

12. A method for routing a call, comprising:
receiving from an encryption module a token representing encrypted data, the encrypted data including sensitive personal information associated with the call;
transmitting the token to a routing engine; and
initiating a query specifying a comparison to be performed against a decrypted version of the encrypted data associated with the token through an interface with the encryption module, the interface isolating the decrypted data from the routing engine to prevent the routing engine from accessing the decrypted data.

13. The method of claim 12, further comprising routing the call based on a response to the query.

14. The method of claim 12, wherein querying the decrypted data includes comparing selective characters of the decrypted data to a predetermined value.

15. A system, comprising:
a computing device including a processor configured to execute instructions to cause the computing device to:
receive a call processing message at a routing engine, the call processing message having a token representing encrypted data, the encrypted data including sensitive personal information associated with the call;
detect the token in the message;
initiate a function configured to perform a query specifying a comparison to be performed against a decrypted version of the encrypted data stored in an encryption module, the query configured to be executed through a custom server application that contains an embedded custom code that provides an interface between the routing engine and the decrypted data in the encryption module, the custom code configured to isolate the decrypted data in the encryption module from the routing engine to prevent the routing engine from accessing the decrypted data; and
determine a call routing path based upon a response to the query.

16. The system of claim 15, wherein the function is initiated by at least one strategy.

* * * * *